United States Patent [19]

de Laage de Meux et al.

[11] 3,857,048

[45] Dec. 24, 1974

[54] AUTOMATIC EQUALIZING AMPLIFIERS FOR THE TRANSMISSION OF DIGITAL SIGNALS

[75] Inventors: Patrick de Laage de Meux, Saint-Germain-en-Laye; Claude Gourdon, Perros Guirec, both of France

[73] Assignee: Societe Lignes Telegraphiques et Telephoniques, Paris, France

[22] Filed: Oct. 15, 1973

[21] Appl. No.: 406,479

[30] Foreign Application Priority Data

July 20, 1973 France .............................. 73.26677

[52] U.S. Cl................... 307/264, 307/237, 328/162, 328/175, 330/138, 330/145, 333/18

[51] Int. Cl....... H03k 1/14, H03q 11/04, H04b 3/04

[58] Field of Search........................... 307/237, 264; 328/162–164, 172, 173, 175, 168; 330/138, 145; 333/18

[56] References Cited

UNITED STATES PATENTS

| | | | |
|---|---|---|---|
| 2,935,697 | 5/1960 | McManis | 330/138 |
| 3,119,077 | 1/1964 | Saari | 330/145 |
| 3,568,100 | 3/1971 | Tarbox | 333/18 |
| 3,737,585 | 6/1973 | Ghosh | 328/164 X |
| 3,763,382 | 10/1973 | Horichi et al. | 330/145 X |

*Primary Examiner*—John Zazworsky
*Attorney, Agent, or Firm*—Abraham A. Saffitz

[57] ABSTRACT

A device for equalizing the electrically equivalent lengths of line sections between successive amplifiers in a digital signal transmission system. It comprises the cascade combination of a plurality of amplifiers, fixed impedance networks and adjustable impedance networks controlled by variable resistances, and includes a feedback path delivering a current to said variable resistances, said current varying according to the average peak amplitude of the output signal of said device. The attenuation provided by the adjustable networks is higher when the equivalent length of the preceding line section is shorter. Means are provided for adjusting the variation ranges of the variable resistors.

7 Claims, 7 Drawing Figures

AUTOMATIC EQUALIZING AMPLIFIERS FOR THE TRANSMISSION OF DIGITAL SIGNALS

The present invention relates to improvements in amplifiers used for the transmission of digital signals (for instance, signals having one of two values conventionally represented by 0 and 1 or by +1 and −1, or one of three values, conventionally represented by +1, 0 and −1), and this more specifically when such signals are transmitted at high speed (for example, 1,000 to 2,000 kilobits per second).

More specifically, the invention relates to such amplifiers, often also called equalizers or regenerators, inserted with convenient spacings in a transmission channel (hereafter called "transmission line," for the sake of simplicity), such spacings being of variable magnitude. For instance, when a transmission line is considered, the length of such spacings, hereafter referred to as "line sections," can vary between 600 and 1,800 meters, with attenuation differences up to 30 dB. The extent of these variations can be larger if said line in not protected against temperature changes.

Generally speaking, it is known that the functions of such an equalizing amplifier is to give back the signals applied to its input the same waveform and amplitude that they orginally had at the input of the line section preceding the considered amplifier. In other words, the gain and equalization as a function of frequency of a given amplifier must have the opposite values to those of the attenuation and linear distortion of this preceding line section.

According to the known art, advantage is taken of the fact that, for a given type of line or other transmission channel, there exists an unchangeable relation between said attenuation and linear distortion, which makes it possible to build an amplifier (and eventually any correcting linear network associated therewith) in such a manner that when its gain equalizes the attenuation of the preceding line section, the distortion as a function of frequency of this section is at the same time automatically equalized and balanced. In other words, the just defined gain and equalization can be controlled by a single variable, for instance a direct voltage or current, proportional to the difference between the mean value of the peak amplitude of signals received at the amplifier output and a fixed preselected value. In this case, it is also of known practice to build the amplifier and the network that are invariably linked therewith so that compensation and equalization are insured for the maximum length of the equlized line section. The effective length of this section can then be taken into account by inserting an additional network, the attenuation and distortion of which are both controlled by the value of said variable, thus simulating the missing line length.

The above-explained principles are more specifically implemented in the device described in the French Pat. No. 1,603,582 corrresponding to U.S. Pat. No. 3,568,100 which uses a single balancing network comprising a single variable element consisting of a resistance made of two semiconductor diodes and the specific value of which is controlled by a variable DC voltage obtained from the amplifier output, as explained above.

However, it has been recognized that it is difficult to obtain exact and full equalization by means of such devices when the variations to equalize are extremely broad, for instance when there may exist at the same time some extreme variations in lengths and in temperatures in the line sections whose electrical charactistics must be equalized. Consequently, systems have been employed in which equalization is effected by means of several networks acting in a progressive and cumulative manner, which are successively introduced when those already introduced are unable to equalize the whole missing line length.

According to the present invention, use is made of an equalizing amplifier including two or more amplifier stages, cascasde-connected with at least two variable corrector networks varying as a function of a control signal derived from the mean value of the output signal peak amplitude of said equalizing amplifier, said control signal being, as the amplitude increases, first applied to a first one of these corrector networks, then to both first and second of said networks, and further to still others of said networks, successive controls of networks of increasing ranks, being insured through increasing amplitude threshold devices.

More specifically, according to the present invention, a digital signal equalizing amplifier is provided, in which at least two partial amplifiers are cascaded-mounted with at least two variable equalizing linear networks whose attenuation and distortion as functions of frequency are adjusted by a DC control signal proportional to the difference between the mean value of the peak amplitude of the output signal of said equalizing amplifier and a fixed reference value, each of said networks including a variable resistor whose value is controlled by said control signal, said equalizing being further characterized in that said control signal is applied to at least a part of these networks through at least one amplitude threshold device having an individually selected threshold level for each one of the networks of said part of said networks.

The invention and its advantages will better be understood upon reading the detailed description of some examples of its embodiments given hereafter, with reference to the annexed drawings, in which.

Figure 1:
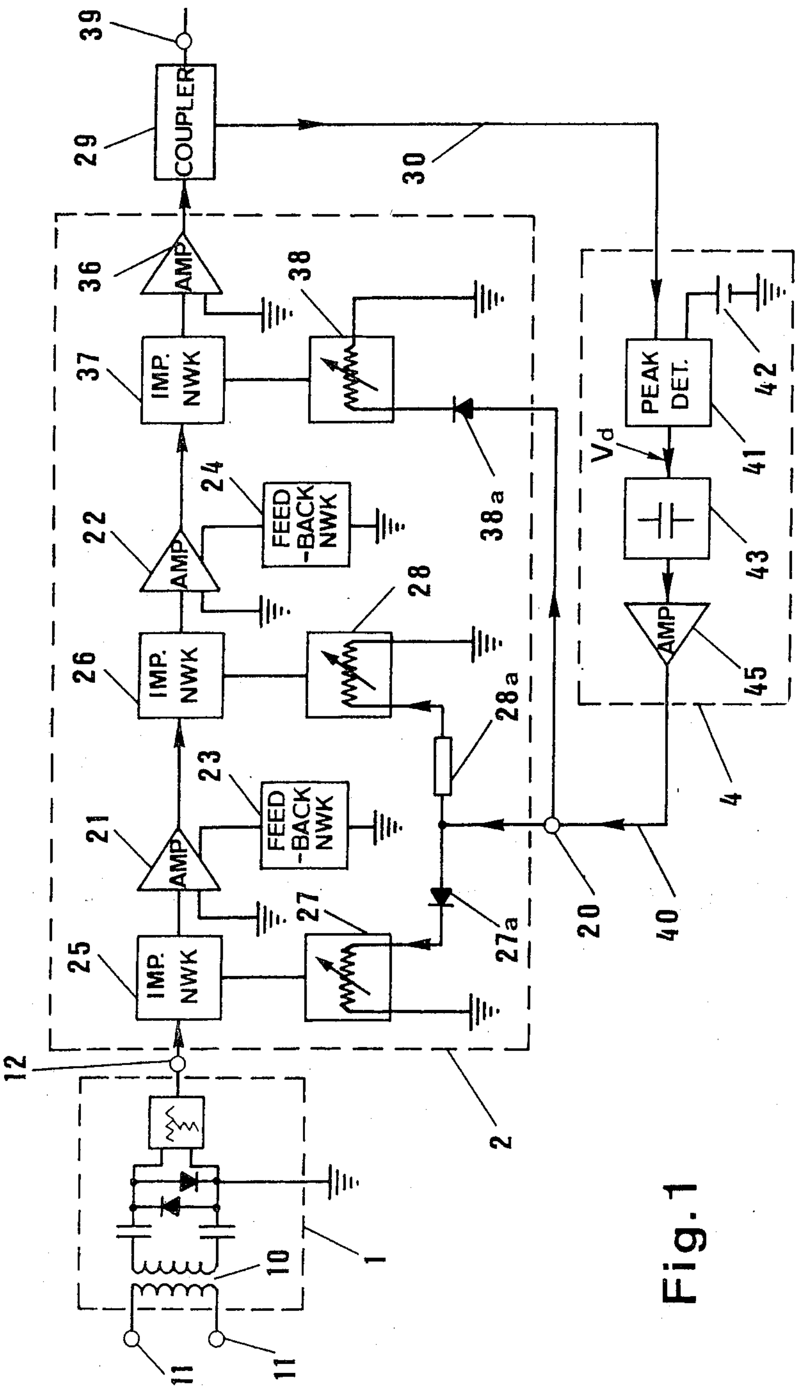
FIG. 1 shows an operational schematic diagram of an automatic equalizing amplfier according to the invention.

Referring first to FIG. 1, it is seen that circuit 1 is a conventional balanced to unbalanced input circuit, linked to an entering transmission line (not shown in the drawing) by means of terminals 11 of the primary winding of a linking transformer 10. Ciricuit 1 also comprises two capacitors, a limiter consisting of two semi-conductor diodes and an attenuator (all conventional components and not parts of the invention) and an output terminal 12 which is also the input terminal of the equalizing amplifier. The system includes an amplifying and equalizing circuit 2 and a detecting and control circuit 4. The latter is connected to the output of 2 by a connection 30 and a coupler 29 which is itself linked to terminal 39, i.e., to the output terminal of amplified signals for the whole arrangement. Output 40 of control circuit 4 is connected to control input 20 of the amplifying and equalizing circuit 2. In the example of FIG. 1, it has been assumed that circuit 2 includes three amplifier stages and three equalizer networks, but this is by no ways a limiting feature of the invention.

Circuit 2 includes therefore three partial amplifiers 21, 22 and 36, and three cascade-connected impedance networks 25, 26, 37 in cascade-connection. Negative feedback impedances 23 and 24 are associated with amplifiers 21 and 22, to give them the desired amplification characteristics as functions of frequency for apoproximately equalizing the maximum considered line length. The circuit includes, in addition, three variable resistors 27, 28, 38 linked, on one hand, respectively, to networks 25, 26, 37 and on the other hand, to terminal 20, respectively by means of a resistor 28*a* or a two-terminal 27*a* or 38*a* (symbolized by a diode), each of the latter networks forming a voltage threshold element in the direction of diode conduction. The control circuit 4 includes a peak detecting and comparator assembly 41 delivering a voltage equal to the difference between the rectified voltage of the signal issuing from 29 and a DC voltage reference supplied by component 42, here represented as a battery. This differential voltage charges a capacitor inserted in a circuit 43 playing the part of a lowpass filter. The voltage at the terminals of such capacitor is applied to the input of the DC current amplifier 45, whose output 40 is connected to terminal 20 of circuit 2.

Elements 23, 24 of the diagram have fixed impedance vs. frequency characteristics and therefore amplifiers 21 and 22 also have fixed gain vs. frequency characteristics. The variable networks 25, 26, 37, however, are connected to the variable resistors 27, 28, 38, respectively, so that the attenuation/frequency characteristics of each of these three neworks 25, 26, 37 depend in a predefined manner on the control current intensity going through the corresponding variable resistor. For a given frequency, this current intensity is, just like the output signal amplitude of circuit 2, all the smaller (or larger) when the compensated line length is longer (or shorter). Attenuation of the "variable resistor network" complex 25, 27; 26, 28; 37, 38 (hereinafter referred to as "length complements" for reasons given further on) and the length of the equalized section therefore vary in opposite directions, making it possible to ensure compensation of attenuation variations which are proper to the line.

According to the invention, each of the length complements 25, 27; 26, 28; 37, 38 operates within a certain portion of the possible variation range of the equalized line length. Assuming, for instance, that networks 27*a* and 38*a* respectively consist of a single diode and of two diodes in series connection with conduction thresholds respectively of 0.7 and 1.4 V, these thresholds are reached, respectively, when the current delivered by the amplifier 45 is such that the voltage drop in resistor 28*a* takes one or the other of said values. This current is all the higher, all other factors being equal, that attenuation due to the line is the smaller; in other words, that the line length is shorter. Designating by L the longest anticipated line length, the two thresholds are successively reached for two lengths $L_1$ and $L_2$ shorter than L (with $L_1 > L_2$). Table I below indicates the corresponding conditions of operation of fixed networks and length complements:

Table I

| Line Length | Fixed networks | Length complements | | |
|---|---|---|---|---|
| L | 23,24 | | | |
| between L and $L_1$ | 23,24 | (25,27) | — | — |
| between $L_1$ and $L_2$ | 23,24 | (25,27) | (26,28) | — |
| below $L_2$ | 23,24 | (25,27) | (26,28) | (37,38) |

Figure 2:
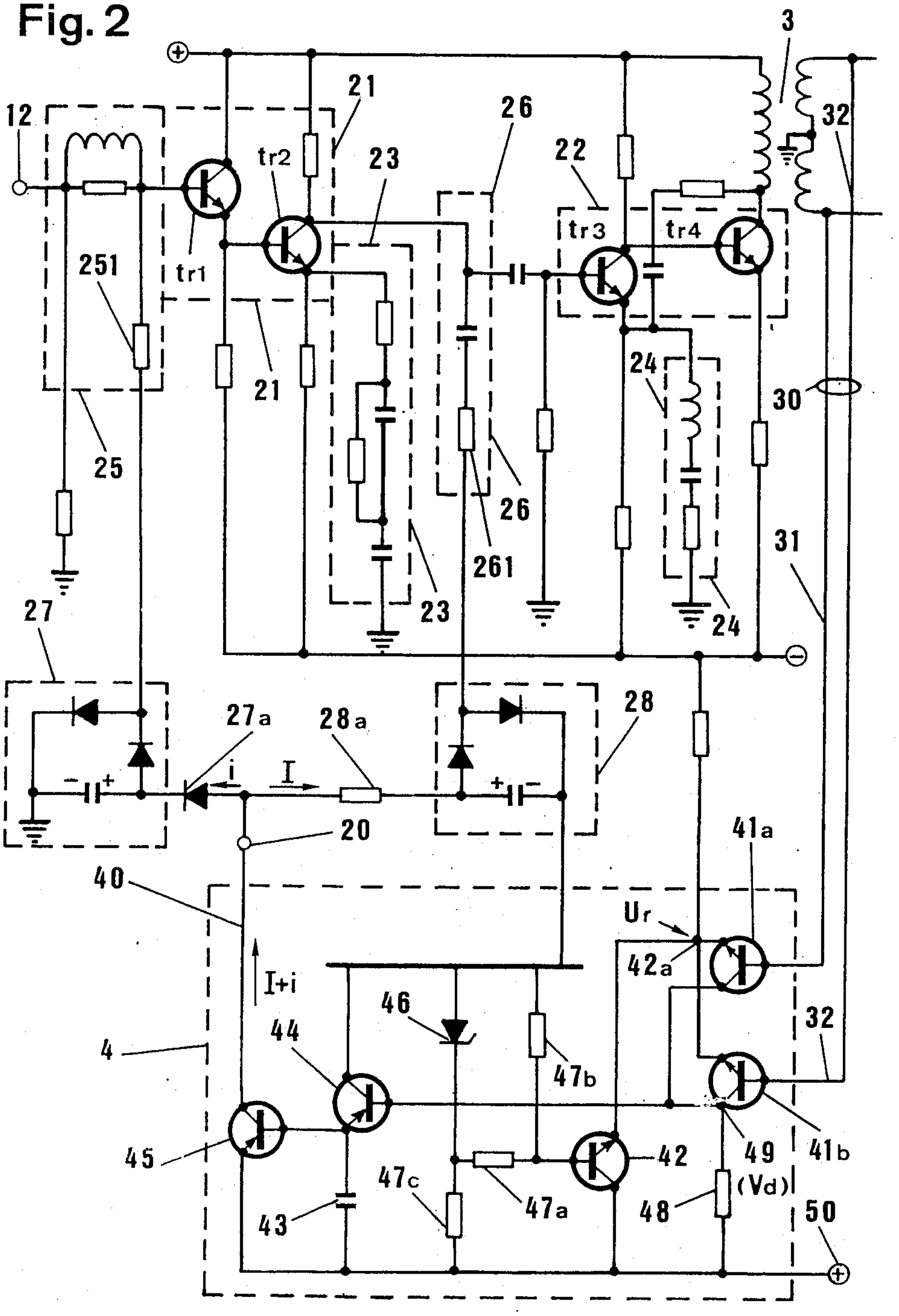
FIG. 2 shows a theoretical schematic diagram of a preferred embodiment of said invention, for the case of signals composed of bipolar pulses.
Figure 3:
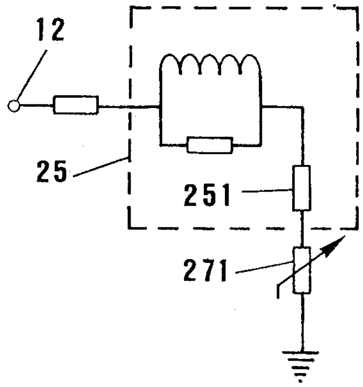
FIGS. 3 and 4 represent circuits equivalent to adjustable networks, respectively, included in the diagram of FIG. 2.

Referring now to FIG. 2, the diagram represents a simplified set up with respect to that of FIG. 1. It includes two linearly operating amplifiers 21, 22 each including two cascade-connected transistors *tr*1, *tr*2 and *tr*3, *tr*4. The fixed networks 23, 24 and lengths complements 25, 27; 26, 28 are made of resistors, capacitors and inductor coils, such as shown on the drawing. Variable resistors 27, 28 are of conventional type and are each formed of two rectifier diodes (one of which linked directly to a constant potential point (hereafter referred to as "ground") and the other grounded through a decoupling capacitor, in order to stabilize the DC bias of these diodes and to minimize some harmonics); control terminal 20, fed by connection 40, is connected to 28 through resistor 28*a* and to 27 through rectifier diode 27*a*.

The embodiment of FIG. 2 is foreseen for digital signals formed of bipolar pulses of alternating polarities; therefore, the coupling element 29 of FIG. 1 is here shown as a transformer 3 whose secondary winding has a grounded center tap, and connection 30 of FIG. 1 includes two leads 31, 32 (FIG. 2) connected to the ends of this secondary winding.

In circuit 1 (FIG. 2), transistors 41*a*, 41*b* have their emitters and collectors respectively and directly interconnected and form an OR gate having as its inputs the bases of these transistors. By means of the "bias network" (source 50, Zener diode 46, resistors 47*a*, 47*b*, 47*c*), transistor 42 establishes at point 42*a* a stable DC voltage U*r* (whose value depends on the breakdown voltage of 46) the value of which can be adjusted, for instance, by adjusting that of resistor 47*a*.

In the comparator assembly consisting of 41*a*, 41*b* on one hand, and 42 on the other hand, the U*r* voltage blocks the two transistors 41*a*, 41*b*, unless the condition arises that, through one or the other of leads 31, 32, a voltage higher than the sum of U*r* and of the residual voltage U*d* of the diode formed by the base-emitter path of 41*a* (or 41*b*) is applied to one of their bases. One of these transistors then becomes conducting. A signal appearing at the secondary of transformer 3 (for instance a pulse of one or the other polarity) will be detected by circuit 4 if the voltage applied by this pulse to one of the bases of transistors 41*a* and 41*b* remains, even for the pulses of the weakest amplitudes — in other words, those that have been most attenuated on the line — higher at least by a small quantity than the sum (U*r* + U*d*). If this is the case, a differential voltage V*d* is developed in resistor 48 and is applied from point 49 to the base of transistor 44, V*d* being proportional (at least approximately) to the difference Dv defined as the voltage applied to one of the bases of 41a and 41b minus (Ur + Ud).

Voltage Vd makes transistor 44 conducting and capacitor 43 is charged (betwen souce 50 and ground); the current injector transistor 45 becomes conducting with a small delay after 44; it delivers a current I to the resistor 28a and to the diodes of the variable resistor 28, so that the latter resistor, which has a variable value according to the value of I, adds to the resistor 261 of network 26. Moreover, if current I exceeds a value that is such that the voltage drop in 28a reaches the threshold voltage in the conduction direction of diode 27a, transistor 45 delivers to the diodes of elements 27 an additional current *i*. Another resistance, also variable as a function of the value of *i*, then adds to that of resistor 251 of network 25.

When the signal which has produced voltage Vd stops, transistor 44 returns to its non-conducting state; capacitor 43 starts to discharge through transistor 45, and a current whose intensity progressively diminishes persists for a short time interval in the diodes of 27 and slightly longer in the diodes of 28.

There are two advantages in the capacitor circuit assembly used in circuit 4; on one hand, the charging time constant of capacitor 43 may be selected long enough for cancelling the generally rather short but high level spurious noises in the signals involved. On the other hand, during a long absence of pulses (for example, a relatively long sequence of zeros in the transmitted signals), if the variable networks were to change their condition too rapidly (becoming non-active), the first pulses which would reappear would be badly corrected, this resulting in the possibility of an important error rate. With a relatively long discharge time constant of capacitor 43, such disturbances are limited and even cancelled, as it has been found by an experiment involving sequences of zeros of various lengths.

Figure 5:
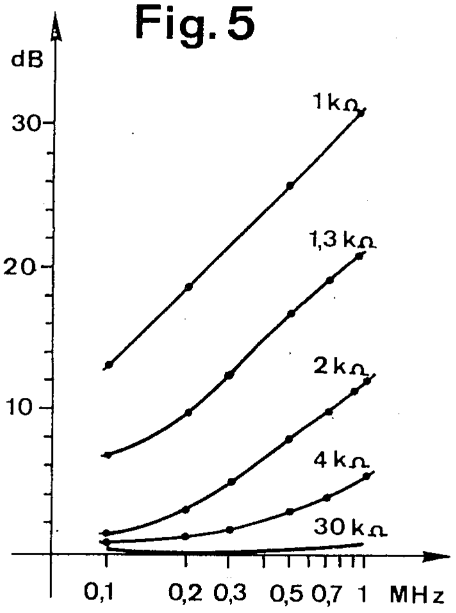
FIGS. 5 and 6 show characteristics of the networks of FIGS. 3 and 4, respectively.
Figure 4:
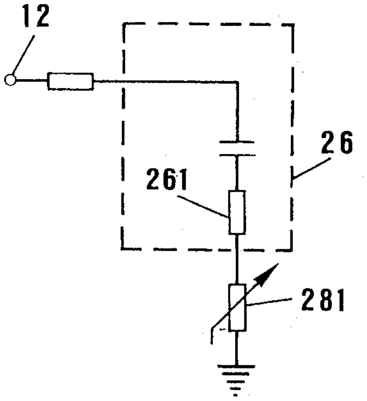
Figure 6:
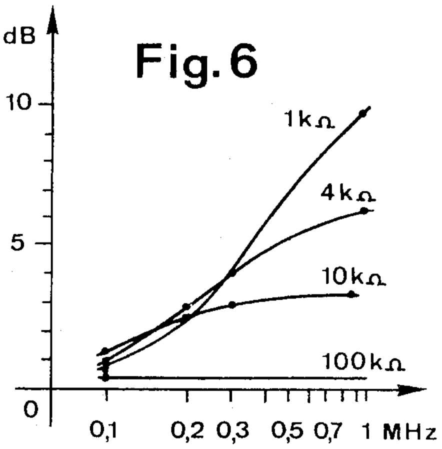

Referring now to FIGS. 3 to 6, FIGS. 3 and 4 show two diagrams that are, respectively, equivalent to the variable networks 25, 27 and 26, 28 of FIG. 2, the variable resistances 271 and 281 being those of the rectifier diodes of elements 27 and 28 of FIGS. 1 and 2. FIGS. 5 and 6 show, respectively, the attenuation vs. frequency characteristics of these networks within a frequency range of 100 kHz to 1 MHz as functions of the total values of resistors (251 + 271) and (261 + 281) shown in kilohms for each curve (approximately and for a specific instance), the minimum value (1 kΩ for each figure) of these resistances corresponding to the minimum resistance of the diodes (some tens of ohms).

Each curve (FIG. 5 or FIG. 6) corresponds to a resistance value of the diode of the corresponding variable resistor and to a means value of the current flowing therethrough, therefore to a defined value of the differential voltage Vd, in other words also to a defined value of the amplitude of the pulse signal in the secondary winding of transformeer 3 of FIG. 2, for a given value of the frequency, and finally, for this frequency, and at least approximately, to a mean value of the length of the corresponding line.

Such correspondences may be theoretically studied, but it is better to check them on a experimental basis. It is also advisable to provide means for the adjustment of the values of resistors 251, 261.

Figure 7:
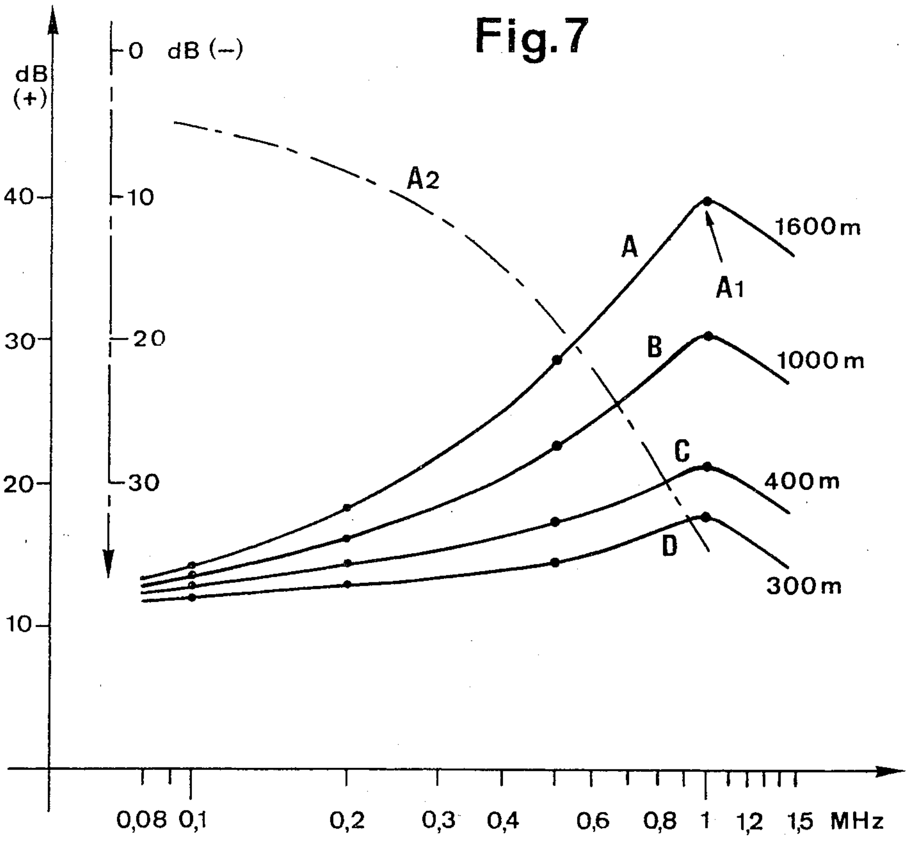
FIG. 7 shows gain characteristics of the device of FIG. 2.

Referring now to FIG. 7, the gain vs. frequency characteristics of the equalizing amplifier is shown for various line lengths, allowing to obtain a very approximate equalizing, for instance within less than 3 dB, of the attenuation characteristics of the corresponding line.

Curve A, plotted on the scale dB (+), corresponds to the maximum foreseen length (1,600 meters) and represents the algebraic sum of the gains of amplifiers 21 and 22, taking into account the fixed feedback networks 23 and 24 (FIG. 2), the action of the adjustable networks being negligible. Conditions A1 of maximum gain is obtained by tuning the network 24 (FIG. 2) (with inductance, capacitance and resistance) to an appropriate frequency within the range of useful frequencies (for instance, 1 MHz for the range of 0.1 to 1.2 MHz). The characteristic A2 (dotted line) represents the attenuation of the 1,600 meters line, referred to the scale dB (−); the above-mentioned approximation condition of less than 3 dB is fulfilled. In this particular case, the use of a single one of the fixed networks 23 or 24 would not allow to obtain this result for the highest frequencies.

Curve B corresponds to a line length for which the variable reisistor 281 (FIG. 4) reaching its lowest values, network 26, 28 has its maximum attenuation effect (curve 1 KΩ of FIG. 6) in the case depicted. This length is approximately 1,000 meters, assuming that the complement 25, 27 has no action for this length (resistor 271, FIG. 3, having an extremely high value), since the voltage drop in 28a does not exceed the direct conduction threshold of diode 27a.

The attenuation of network 25, 27 adds to the preceding one for lengths greater than $L_1$ for which the latter threshold is reached. This length can be set at various values by adjustment of resistor 28a. In the instance of FIG. 7, $L_1$ is taken equal to 1,000 meters (at least approximately). Under these conditions, the other characteristics C and D (FIG. 7) correspond to approximate lengths and resistances of 400 meters and 2.5 kΩ, and 300 meters and 3.8 kΩ, respectively.

In this event that the length would be less than 1,000 meters, characteristic B would be valid for all lengths from 1,000 meters to $L_1$.

It is also possible to select for $L_1$ a value above 1,000 meters (for this specific case) so that for this length of 1,000 meters the networks 26, 28 do not have their maximum effect, while that of networks 25, 27 is noticeable and adds to the former; the corresponding characteristic in FIG. 7 would then be different from that shown as curve B.

Generally speaking, the adjustment of the fixed resistors 251, 261) of networks 25, 27 and 26, 28 (as shown on FIGS. 3, 4, 5, 6) and the adjustment of resistor 28a allows one to vary more or less substantially the behavior of the actual characteristics and to finally obtain overall characteristics of equalization that are very near the ideal ones.

The equipment of the invention is endowed with the great advantage of being of compact structure insofar as the various stages of amplification and the impendance networks are concerned. Its compactness is fully taken advantage of by the construction of its units in the form of thin layer hybrid circuits, for instance. The only discrete elements to be used are transistors and diodes and, eventually, inductance coils for networks that need them. It is always possible to build most networks from resistors and capacitors, so that the equipment may be built to a very large extent according to said technology.

What we claim is:

1. An equalizing amplifier for digital signals, comprising at least two partial amplifiers cascade-connected with at least two variable compensating linear networks, the attenuation and frequency distortion of which are controlled by a direct-current control signal proportional to the difference between the means value of the peak amplitude of the output signal of said equalizing amplifier and a fixed reference voltage, in which each one of said networks includes a variable resistor the value of which is controlled by said control signal, said equalizing amplifier being further characterized in that said control signal is applied to at least part of said networks through at least one semiconductor diode threshold device in the direct conduction direction having its threshold level individually selected for each one of the networks of said part of said networks.

2. An equalizing amplifier as claimed in claim 1, in which said variable resistors each consist of an assembly of two series connected semiconductor diodes in direct conduction direction and through which there flows a control current proportional to said control signal.

3. An equalizing amplifier as claimed in claim 2, in which a decoupling capacitor is in parallel connection with the series assembly of said diodes.

4. An equalizing amplifier as claimed in claim 1, in which said diodes are individually series connected to a fixed resistor.

5. An equalizing amplifier as claimed in claim 1, in which said fixed reference voltage is taken across a Zener diode.

6. An equalizing amplifier as claimed in claim 1, in which at least part of said linear networks are made of capacitors and resistors.

7. An equalizing amplifier as claimed in claim 1, in which said control signl is obtained from a circuit including a peak detector charging a capacitor, the voltage across which is amplified by a direct current amplifier whose output delivers said control signal.

* * * * *